(12) United States Patent
Vyskocil et al.

(10) Patent No.: US 6,217,627 B1
(45) Date of Patent: Apr. 17, 2001

(54) CAM OPERATED DRAWER STYLE AIR CLEANER

(75) Inventors: Frank Vyskocil, Chatham; Chris Hoffmann, Winsor, both of (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/342,290

(22) Filed: Jun. 29, 1999

(51) Int. Cl.⁷ ................................................ B01D 39/00
(52) U.S. Cl. ........................ 55/492; 55/502; 55/503; 55/504; 55/383.5; 123/198 E
(58) Field of Search ........................... 55/502, 503, 504, 55/492, 385.3; 123/198 E

(56) References Cited

U.S. PATENT DOCUMENTS

| | | | |
|---|---|---|---|
| 5,125,941 | * | 6/1992 | Ernst et al. ........................... 55/502 |
| 5,605,554 | * | 2/1997 | Kennedy ............................. 55/502 |
| 5,725,624 | * | 3/1998 | Ernst et al. .......................... 55/502 |
| 5,740,774 | * | 4/1998 | Kennedy ......................... 123/198 E |

* cited by examiner

Primary Examiner—David A. Simmons
Assistant Examiner—Betsey Morrison Hoey
(74) Attorney, Agent, or Firm—Carlson, Gaskey & Olds

(57) ABSTRACT

An air cleaner for purifying air is disclosed. The air cleaner includes a housing having a first shell mounted to a second shell. The air cleaner also includes a filter disposed within the second shell and having a first side and a second side. Also, the air includes a flexible seal disposed between the first side of the filter and the first shell of the housing. At least one cam is rotatably mounted to the second shell and adapted to selectively engage the second side of the filter to compress the seal between the first side of the filter and the first shell of the housing.

20 Claims, 4 Drawing Sheets

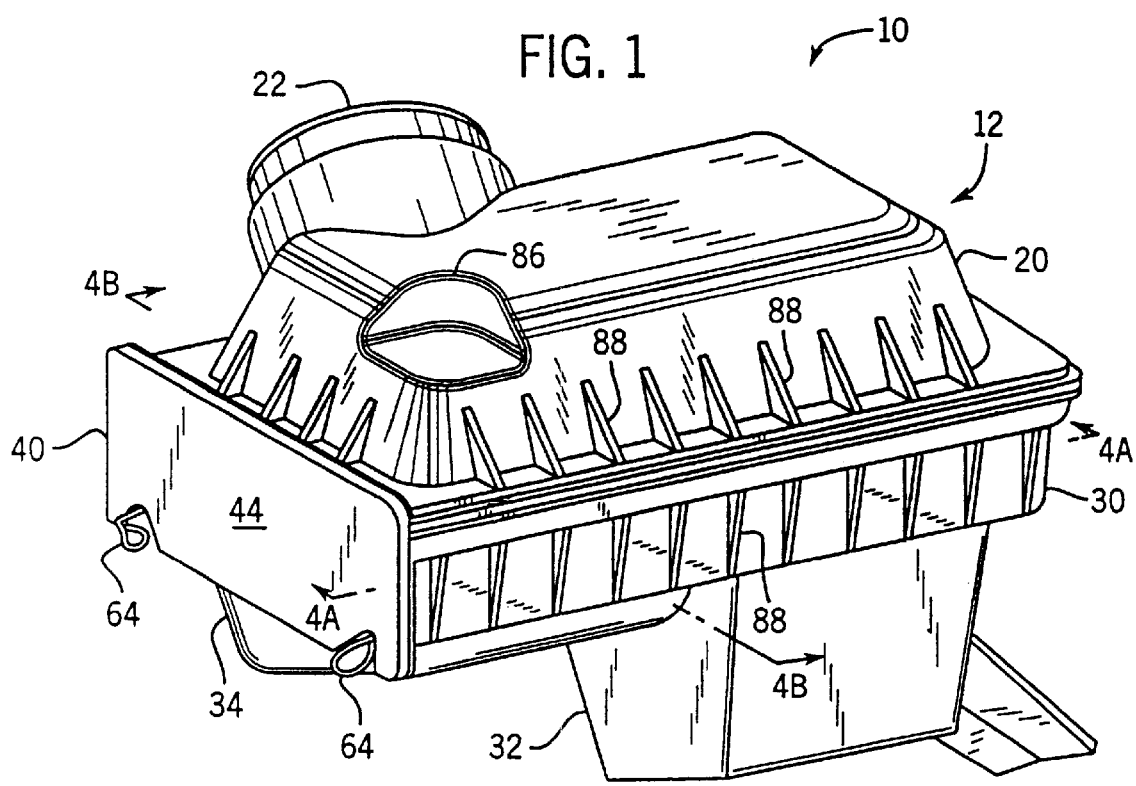
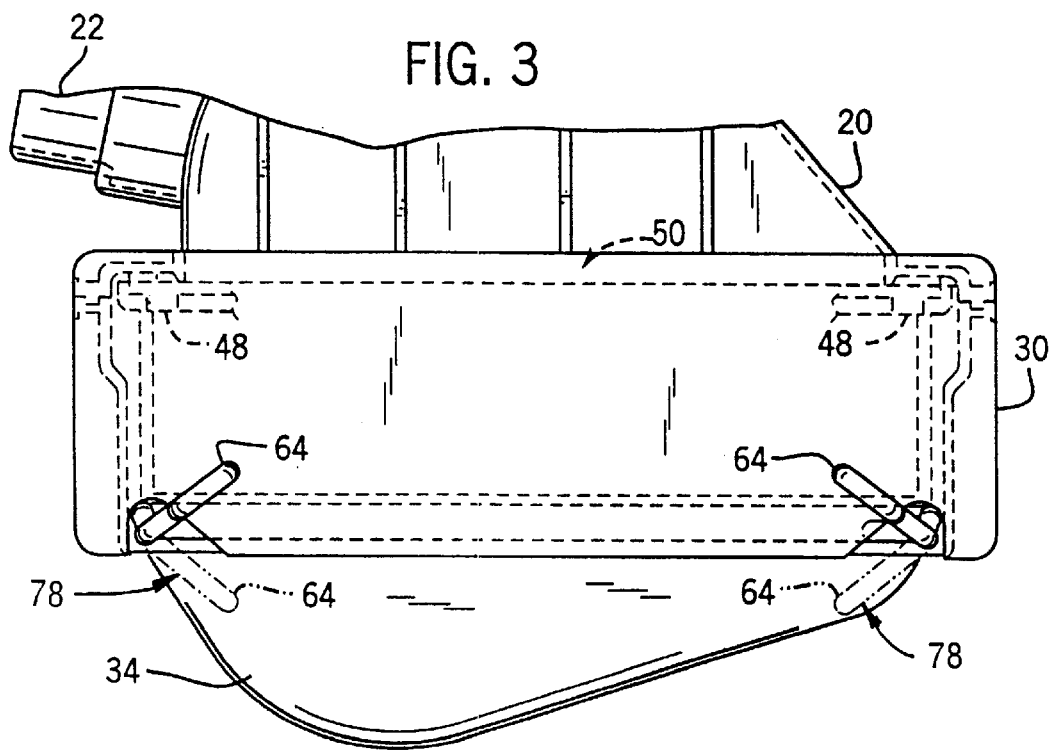

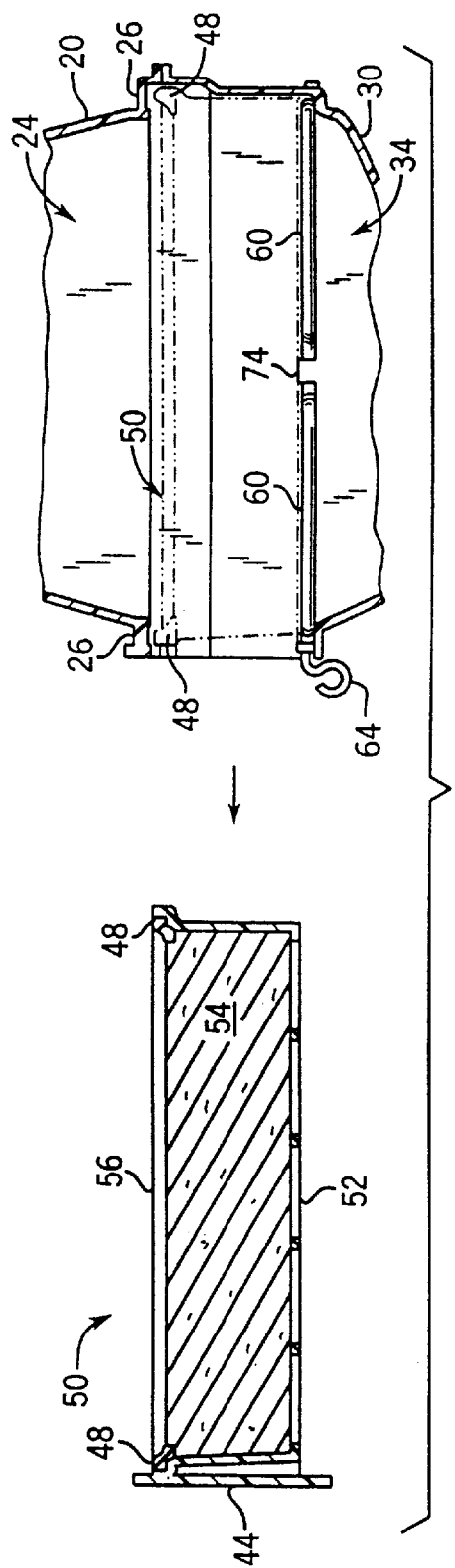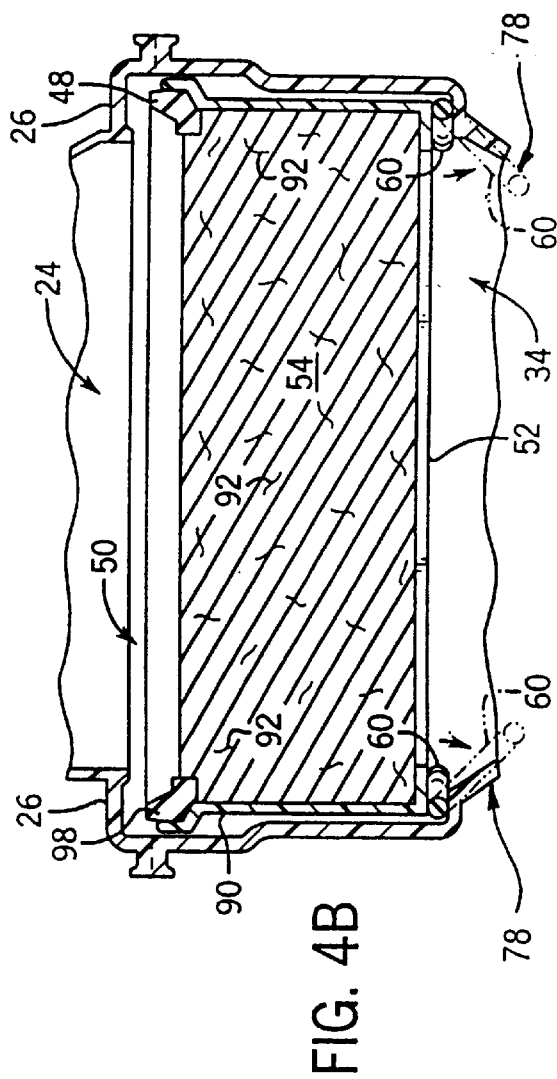

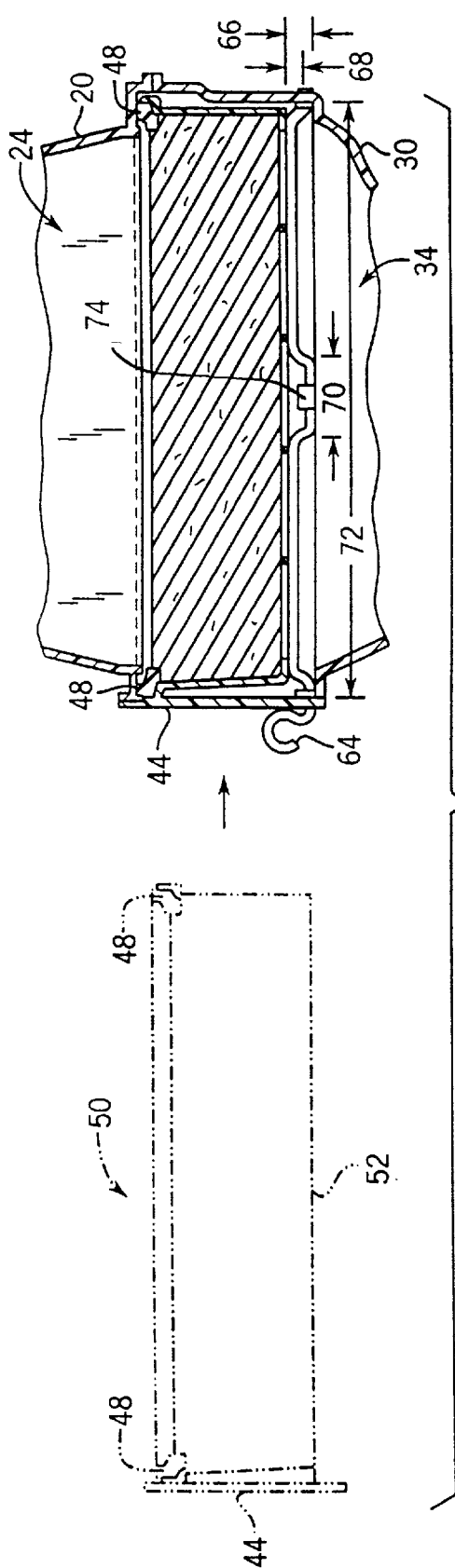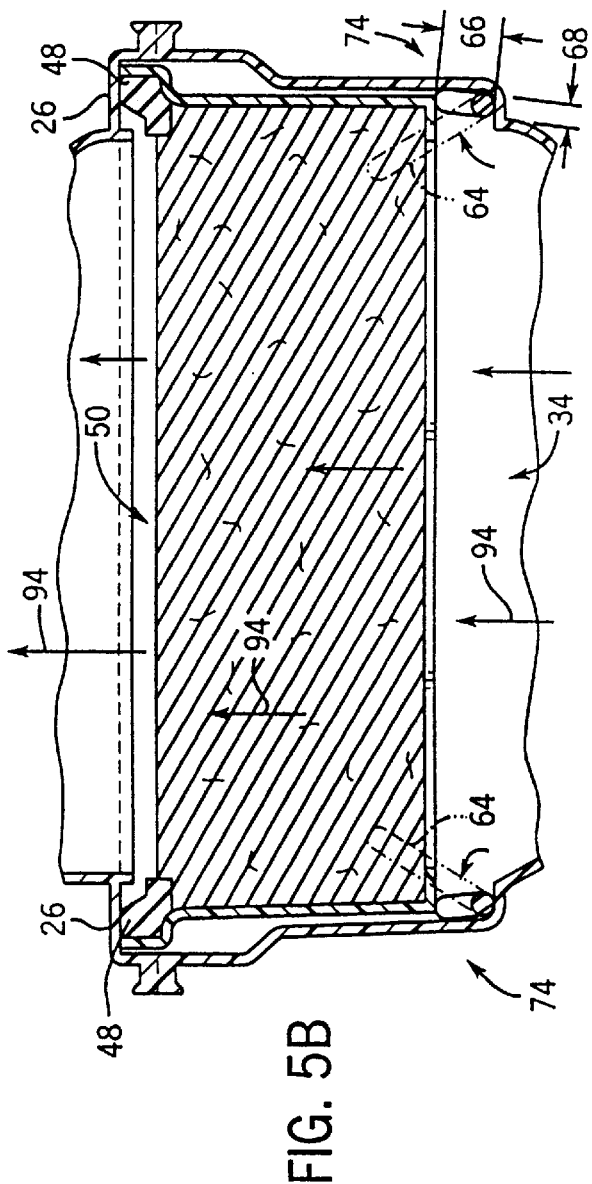
FIG. 5A
FIG. 5B

CAM OPERATED DRAWER STYLE AIR CLEANER

FIELD OF THE INVENTION

The present invention relates generally to an air cleaner for motor vehicles. In particular, the present invention relates to devices and methods for inserting a cam operated drawer style air filter element in a housing and positioning the filter in the housing.

BACKGROUND OF THE INVENTION

It is well known to provide an air cleaner for purifying raw air before mixing the raw air with fuel. Such known air cleaners typically include an air filter element disposed between a top shell and a bottom shell. The bottom shell typically includes an air intake and the top shell typically includes an air exhaust, which leads to an intake manifold of an internal combustion engine. In operation, such known air cleaners provide for the intake of raw air, the purification of the raw air and the routing of the purified air to the air exhaust. However, a problem with such known air cleaners is the leakage of raw air from the bottom shell to the air exhaust before passing through the filter element.

In an attempt to overcome the problem of air leakage, some known air cleaners include a seal disposed between abutting top and bottom shells. Compression of the seal is accomplished by exerting a significant compressive force on the shells and coupling the shells together to maintain the compressive force. According to some known arrangements, the shells may be permanently coupled, such as by welding, to maintain the compressive force. However, permanently coupling the shells with a filter inside has the disadvantage of preventing access to the filter element for repair or replacement.

According to other known arrangements, the shells may be temporarily coupled together using many screws evenly spaced around the periphery of the air cleaner to maintain the compressive force. To repair or replace the filter element, the screws are unfastened, the filter element is repaired or replaced and the screws are then refastened. However, this operation has the disadvantage of requiring a significant amount of time and may result in the uneven compression of the seal, which compounds the problem of air leakage.

What is needed, therefore, is an improved air cleaner that is capable of establishing an adequate seal to impede raw air from bypassing a filter element. It would also be advantageous to have an air filter element capable of rapid replacement in an air cleaner. It would further be advantageous to have a method of rapidly installing a filter element in an air cleaner.

SUMMARY OF THE PRESENT INVENTION

The present invention relates to an air cleaner for purifying air. The air cleaner includes a housing having a first shell coupled to a second shell. The air cleaner also includes an air filter element disposed within the second shell and having a first side and a second side. Also, the air cleaner includes a flexible seal disposed between the first side of the filter and the first shell of the housing. At least one cam is rotatably mounted to the second shell and adapted to selectively engage the second side of the filter to compress the seal between the first side of the filter and the first shell of the housing.

The present invention further relates to an air filter for filtering combustion air for an internal combustion engine disposed in a housing, the housing has a first shell mounted to a second shell. An inlet is mounted to the first shell, and an outlet is mounted to the second shell. At least one cam is rotatably mounted to the second shell. The air filter includes a container adapted to be selectively engaged by the cam. The air filter also includes a filter element adopted to filter the combustion air having a first side and a second side, the second side of the filter element being supported by the container. Also, the air filter includes a flexible seal disposed between the first side of the filter element and the first shell. The seal forms a closure between the filter element and the first shell to increase the amount of air directed through the air filter.

The present invention further relates to a method of installing an air filter in an air cleaner. The air cleaner includes a housing. The housing has a first shell with an inlet and mounted to a second shell having an outlet. The air cleaner also includes an air filter having a first side and a second side. The air cleaner also includes a flexible seal disposed between the first side of the air filter and the first shell of the housing. Also, the air cleaner includes at least one cam rotatably mounted in the housing. The method includes sliding the filter into the second shell. The method also includes rotating the cam to engage the second side of the filter. Also, the method includes moving the filter toward the first shell. The method also includes compressing the seal between the first side of the filter and the first shell.

It is an object of this invention to provide an air cleaner that is capable of establishing an effective seal to impede the leakage of air in the air cleaner. It is also an object of this invention to provide an air filter element capable of rapid replacement in an air cleaner. It is a further object of this invention to provide a method of rapidly installing an air filter in an air cleaner. Other objects, features and advantages of the invention will become apparent to those skilled in the art upon review of the following FIGURES, the detailed description and the appended claims.

BRIEF DESCRIPTION OF THE DRAWINGS

FIG. 1 is a perspective view of an air cleaner in accordance with a preferred embodiment of the present invention;

FIG. 3 is a fragmentary front elevation view of an air cleaner showing a seal in an engaged position according to an exemplary embodiment of the present invention;

FIG. 4A is a fragmentary cross-sectional view of the air cleaner about line 4A—4A of FIG. 1 showing a container extended relative to a housing;

FIG. 4B is a fragmentary cross-sectional view of the air cleaner about line 4B—4B of FIG. 1 showing the seal in a disengaged position;

FIG. 5A is a fragmentary cross-sectional view of the air cleaner about line 4A—4A of FIG. 1 showing the container retracted relative to the housing; and FIG. 5B is a fragmentary cross-sectional view of the air cleaner about line 4B—4B of FIG. 1 showing the seal in an engaged position.

Figure 2:
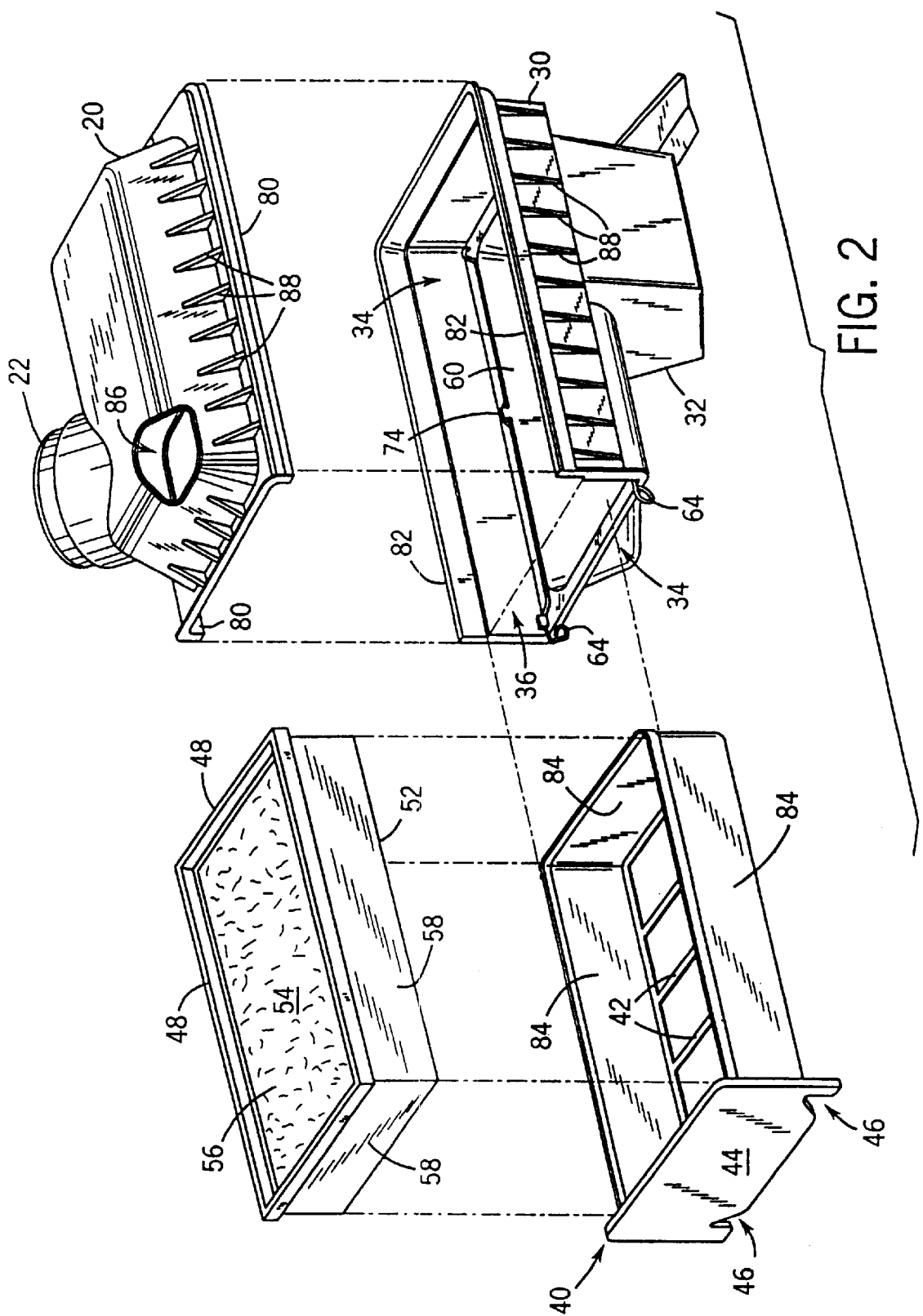
FIG. 2 is an exploded perspective view of the air cleaner of FIG. 1.

Before explaining in detail at least one preferred embodiment of the subject matter recited in the claims, it is to be understood that the subject matter recited in the claims is not limited in its application to the details of construction and the arrangement of the components set forth in the following description or shown in the FIGURES. The subject matter recited in the claims is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, an air cleaner 10 is shown according to a preferred embodiment of the present invention. Air cleaner 10 includes a housing 12 providing an upper shell 20 coupled to a lower shell 30. A container (shown as a drawer 40) supporting a replaceable filter element 50 is disposed between upper shell 20 and lower shell 30. A cam shaft 60 (shown in FIG. 2) is provided within the interior of housing 12.

In the operation of air cleaner 10, raw air enters an air conduit or intake (shown as an air inlet 32) of lower shell 30. The raw air is routed to a cavity (shown as a reservoir 34) of lower shell 30 through an air receiving surface 52 of filter element 50. While passing through filter element 50, impurities (e.g., particulates, gasses, dirt, pollution, etc. and shown as debris 92) may be removed from the raw air and embedded in a cleaning medium 56. (See FIG. 5B.). The purified air exits filter element 50 through an air emitting surface 54 to a cavity (shown as a reservoir 24) of upper shell 20. The purified air is routed through an air conduit or exhaust (shown as an air outlet 22) of upper shell 20. An arrow 94 shows the general directional flow of the air.

After a period of time, the effectiveness of filter element 50 may be decreased due to various factors (e.g., deposition of debris, age, time, wear, etc.). Accordingly, air cleaner 10 may be configured for the selective extension and retraction of drawer 40 relative to housing 12. Referring to FIG. 4A, filter element 50 is shown in a position extended from housing 12. The extension of filter element 50 is accomplished by applying a force (e.g., in the horizontal direction) on an exterior wall (shown as a handle 44) of drawer 40 and sliding or extending drawer 40 from housing 12. Handle 44 includes a generally triangular-shaped aperture 46 configured to permit drawer 40 to slide past a stem 64 of shaft 60 extending from the interior of housing 12 when shaft 60 is in an unlocked position 78. (See FIG. 3.) An expired or used filter element may be removed from the extended drawer and replaced with a new or repaired filter element. A force (e.g., in the horizontal direction) may be applied to handle 44 of drawer 40 to slide or retract drawer 40 into lower shell 30 of housing 12. In retracting drawer 40 into housing 12, a generally flexible or resilient seal 48, which is mounted to and integral with the periphery of filter element 50, is oriented in a disengaged position relative to a sealing surface (shown as a flange 26) of upper shell 20 as shown in FIG. 4B. In its disengaged position, seal 48 is not in adequate contact with flange 26 to reduce the leakage of raw air around the periphery of seal 48 (see FIG. 4B).

Cam shaft 60 assists in providing adequate contact between seal 48 and flange 26 of upper shell 20 to reduce the leakage of air around the periphery of seal 48. When seal 48 is pressed against flange 26 as shown in FIG. 5B, an effective seal or closure is created between filter element 50 and flange 26 to reduce the amount of air that may bypass air receiving surface 52 of filter element 50. Referring to FIG. 5A, shaft 60 is shown disposed adjacent to the base of drawer 40. Shaft 60 may be generally tubular shaped (e.g., a solid or hollow rod) generally extending the length of drawer 40 and lower shell 30. Shaft 60 may be bent in the general shape of an M having a major width 66 greater than a minor width 68. Shaft 60 acts as a cam when rotated because of the differences in width between major width 66 and minor width 68. (Stem 64 provides an operator with the mechanical advantage necessary to rotate shaft 60.) To engage seal 48 against flange 26, stem 64 of shaft 60 is rotated about ninety degrees in the counterclockwise direction. Such rotation of shaft 60 causes a major portion 72 of shaft 60 to engage the base of drawer 40 and minor portion 70 engages a tab 74 of the drawer 40. As shaft 60 is rotated, drawer 40 is moved toward upper shell 20. As drawer 40 is moved toward upper shell, the compression of seal 48 creates a seal or closure to reduce the leakage of raw air from around the periphery of filter element 50 without first passing through air receiving surface 52 of filter element 50.

When shafts 60 are rotated from their unlocked position in FIG. 4A to their locked positions in FIG. 5B, they lift the filter element toward the sealing surface compressing seal 48 therebetween. Eventually, shafts 60 are rotated over-center, permitting seal 48 to decompress and wedge shafts 60 against an inner wall of housing 12, as shown in FIG. 5B. In this position, the seal causes pressure to be applied to shafts 60, preventing them from rotating and releasing the filter element.

Referring to FIG. 2, drawer 40 has sides 84, is generally rectangular-shaped, and is configured to receive filter element 50. An opening (shown as an aperture 36) may be provided across a side of lower shell 30, through which drawer 40 may be extended and retracted relative to housing 12. Filter element 50 is adapted to fit or nest within the interior of drawer 40. Filter element includes a panel (shown as a sidewall 58) that circumscribes cleaning medium 56. Filter material 56 may be constructed of a porous material (e.g., cardboard, corrugated paper, carbon block, etc.) or a natural or synthetic fibrous material (e.g., spun polyethylene, glass wool, microbial filter, etc.) preferably fan folded to provide a large filtering area. Air receiving portion 52 of filter element 50 is supported by a support member (shown as a brace 42) integral with the base of drawer 40 such that air receiving surface 52 is accessible to raw air located or stored in reservoir 34 of lower shell 30.

Inlet 32 of lower shell 30 provides a convenient mounting point for conduits routing raw air from the exterior of housing 12 to reservoir 34 of lower shell 30. The raw air routed to the interior of housing 12 through inlet 32 may be held in reservoir 34 of lower shell 30 for storage, heating, preprocessing, etc. An upward surface 82 of lower shell 30 is mounted to a downward surface 80 of upper shell 20 by a fastener such as a mechanical weld (not shown). According to an alternative embodiment of the present invention, the upper shell may be temporarily coupled to the lower shell by a fastener such as a clasp or a screw. According to other alternative embodiments, the upper shell may be hinged to the lower shell to permit the shells to be pivotally opened and closed.

Outlet 22 of upper shell 20 provides a convenient mounting point for conduits leading the purified air to a location for further processing (e.g., to an intake manifold of an internal combustion engine where the purified air may be mixed with fuel). The purified air may be held in reservoir 24 of upper shell 20 before being routed to outlet 22. Upper shell 20 may include structural irregularities such as an indentation 86 for the placement of accessories (e.g., valves, tubes, pipes, automotive hardware, etc. (not shown)) adjacent or attached to air cleaner 10. Ribs or fins 88 may be provided on lower shell 30 and upper shell 20 to give structural support for housing 12.

According to a particularly preferred embodiment, the air cleaner is used to purify air before the air is routed to an automotive or vehicular engine. The upper shell and the lower shell are preferably constructed of metal or plastic. The filter is preferably constructed of paper folded in a zigzag configuration. The seal is preferably constructed of foam rubber. The cam shaft is preferably constructed of metal. The stem of the cam shaft is preferably covered with a rubber or plastic sleeve or glove. When the cam shaft is rotated to the locked position, the shaft is preferably positioned "over-center" such that the major width is not perpendicular to the base of the drawer. Alternatively, clips, catches or other releasable fasteners may be provided to keep the shaft in a locked position.

It should be noted that the use of the term "conduit" is not meant as a term of limitation, insofar as any "valve" or like structure providing a channel or passageway through which air may flow is intended to be included in the term. It should be noted that the use of the term "routed" is not meant as a term of limitation, insofar as any "direction" or leading of raw or purified air into, through and out of the air cleaner is intended to be included in the term.

While a preferred embodiment of the invention is as described above, there are several substitutions that may be made without departing from the beneficial features of the above-described invention such as variations in sizes, structures, shapes and proportions of the various elements, values of parameters, mounting arrangements, or use of materials. For example, the mechanical weld of the housing may be replaced with such well known substitutions as an interlocking tab and slot arrangement, which would have the added benefit of permitting the upper shell to be removed entirely from the lower shell. The shells may be fastened by screws, rivets, clamps, welding or other conventional methods. According to alternative embodiments of the present invention, the air cleaner may be rotated such that the filter element is top-loaded into the housing, rather than side-loaded into the housing. The opening in housing 12 for the filter may be provided in either or both shells. The cam shaft may engage the bottom side or flange of the filter element or container. According to other alternative embodiments, the seal may be mounted to the upper shell, fixed to a rigid or semi-rigid framework that also extends about the periphery of the filter element, or detached from both the upper shell and the filter element Thus, it should be apparent that there has been provided in accordance with the present invention a cam operated drawer style air cleaner that fully satisfies the objectives and advantages set forth above. Although the invention has been described in conjunction with specific embodiments thereof, it is evidence that many alternatives, modifications and variations will be apparent to those skilled in the art. Accordingly, the invention is intended to embrace all such alternatives, modifications and variations that fall within the spirit and broad scope of the appended claims. Other substitutions, modifications, changes and omissions may be made in the design, operating conditions and arrangement of the preferred embodiments without departing from the spirit of the invention as expressed in the appended claims.

What is claimed is:

1. An automotive air cleaner for purifying combustion air for an internal combustion engine, comprising:
    a housing having a first shell coupled to a second shell, an air inlet disposed to receive combustion air, and an air outlet disposed to transmit combustion air;
    an air filter element disposed within the second shell and having a first side and a second side;
    a flexible seal disposed between the first side of the filter and the first shell of the housing; and
    at least one cam rotatably mounted to the second shell and adapted to selectively engage the second side of the filter to compress the seal between the first side of the filter and the first shell of the housing.

2. The air cleaner of claim 1 further comprising a container supporting the second side of the filter.

3. The air cleaner of claim 2 wherein the second shell further includes a cavity and the container is disposed within the cavity.

4. The air cleaner of claim 3 wherein the housing is configured to receive the container for slidable placement between the first shell and the second shell.

5. The air cleaner of claim 4 wherein when the cam is rotated the filter element is moved toward the first shell to compress the seal against the first shell.

6. The air cleaner of claim 5 wherein the first shell further includes a sealing surface and the seal is disposed against the sealing surface.

7. The air cleaner of claim 6 wherein the filter is generally rectangular shaped.

8. The air cleaner of claim 7 wherein the housing is plastic.

9. The air cleaner of claim 7 wherein the cam further includes a stem.

10. The air cleaner of claim 4 wherein the cam further includes a first width greater than a second width.

11. The air cleaner of claim 4 wherein the seal is mounted to the first side of the filter.

12. The air cleaner of claim 4 wherein the housing further includes a first air conduit integral with the first shell and a second air conduit integral with the second shell.

13. An air filter for filtering combustion air for an internal combustion engine disposed in a housing, the housing having a first shell mounted to a second shell, an inlet mounted to the first shell, an outlet mounted to the second shell, and at least one cam rotatably mounted to the second shell, the air filter comprising:
    a container adapted to be selectively engaged by the cam;
    a filter element adapted to filter the combustion air and having a first side and a second side, the second side of the filter element supported by the container; and
    a flexible seal disposed between the first side of the filter element and the first shell;
    wherein the seal forms a closure between the first side of the filter element and the first shell to increase the amount of air directed through the filter element.

14. The air filter of claim 13 wherein the container is configured for slidable placement in the housing and between the first shell and the second shell.

15. The air filter of claim 14 wherein the second side of the filter element is engageable with the cam to move the filter element toward the top shell and thereby compress the seal between the filter element and the top shell when the cam is rotated.

16. The air cleaner of claim 15 wherein the seal is mounted to the periphery of the first side of the filter element.

17. A method of installing an air filter in an air cleaner having a housing, the housing having a first shell with a first air conduit and mounted to a second shell with a second air conduit, an air filter having a first side and a second side, a flexible seal disposed between the first side of the air filter and the first shell of the housing, and at least one cam rotatably mounted in the housing, the method comprising:
    sliding the filter into the second shell;
    rotating the cam to engage the second side of the filter;
    moving the filter toward the first shell; and
    compressing the seal between the first side of the filter and the first shell.

18. The method of 17 wherein the step of sliding the filter into the second shell further comprises the step of sliding the filter into a cavity of the second shell.

19. The method of claim 18 wherein the step of rotating the cam further comprises the step of rotating a stem of the cam that is disposed outside the housing.

20. The method of claim 19 wherein the filter is substantially planar and wherein the step of sliding the filter further includes the step of sliding the filter into the cavity in a direction parallel to a plane of the filter.

* * * * *